Oct. 23, 1956  A. G. FOLLOWS  2,768,060
MANUFACTURE OF POTASSIUM BICARBONATE
BY USE OF STRONGLY BASIC AMINES
Filed Nov. 30, 1953
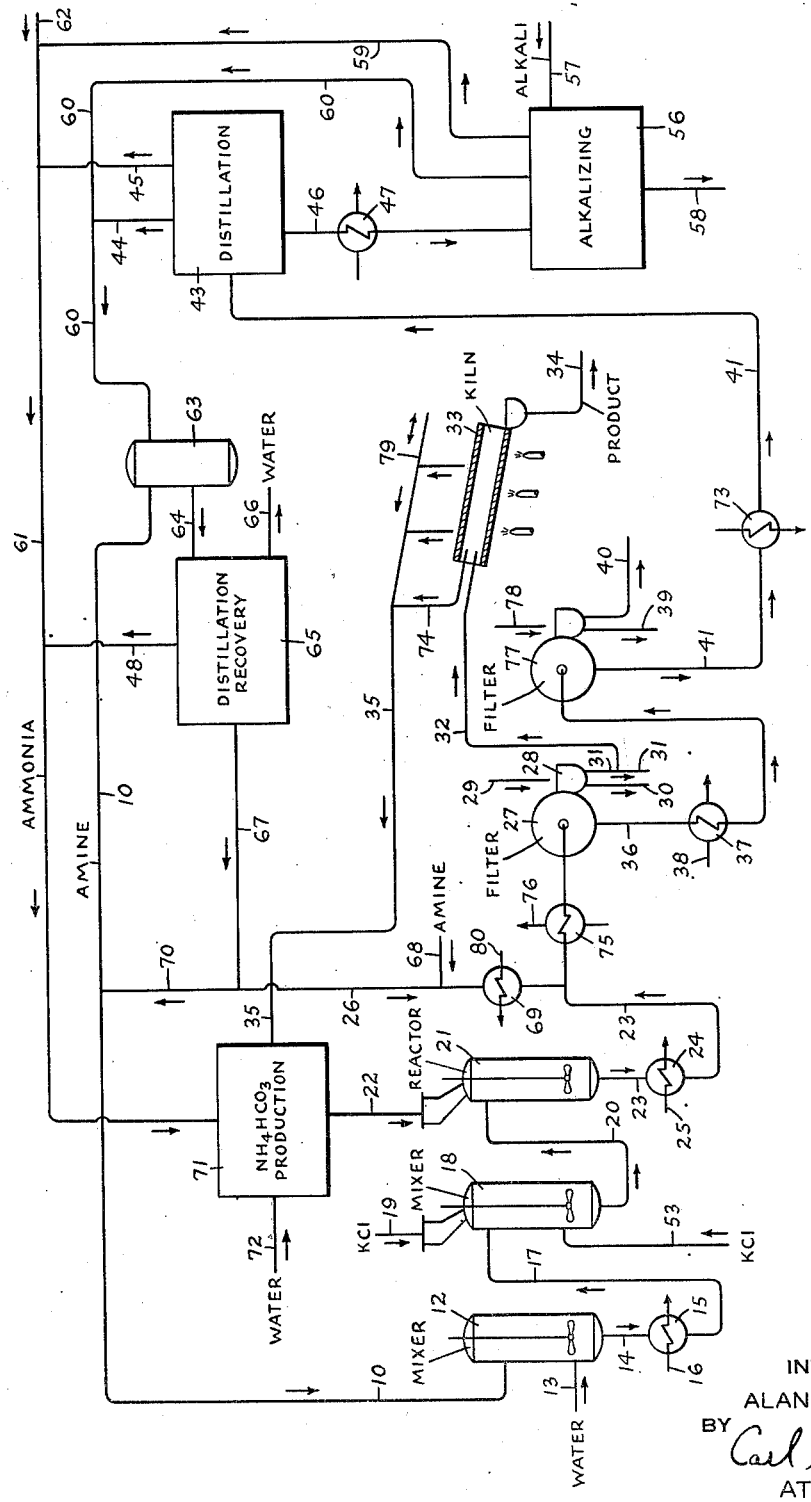
INVENTOR.
ALAN G. FOLLOWS
BY
ATTORNEY.

United States Patent Office 2,768,060
Patented Oct. 23, 1956

2,768,060

MANUFACTURE OF POTASSIUM BICARBONATE BY USE OF STRONGLY BASIC AMINES

Alan G. Follows, Syracuse, N. Y., assignor to Allied Chemical & Dye Corporation, New York, N. Y., a corporation of New York Application November 30, 1953, Serial No. 395,174

13 Claims. (Cl. 23—64)

This invention relates to the manufacture of potassium bicarbonate and potassium carbonate from potassium chloride.

As is generally known to those skilled in the art, the ammonia-soda process for the manufacture of sodium bicarbonate and sodium carbonate from sodium chloride, has proven to be uniquely successful, to the extent that it has almost entirely displaced other processes, such as the LeBlanc process. In the ammonia-soda process, an aqueous solution of sodium chloride is contacted with ammonia and carbon dioxide to produce sodium bicarbonate, according to the following equation:

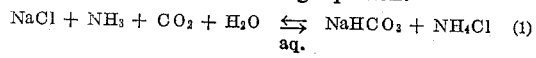
$$NaCl + NH_3 + CO_2 + H_2O \underset{aq.}{\rightleftarrows} NaHCO_3 + NH_4Cl \quad (1)$$

Sodium bicarbonate is readily separated from the resulting aqueous solution and, if desired, it may be calcined to produce sodium carbonate.

It is a generally acknowledged fact that in substantially all of its chemical reactions, potassium functions substantially the same as sodium. It would thus seem that potassium bicarbonate could be made according to Reaction 1 by the simple expedient of substituting potassium chloride for sodium chloride. This has been tried and found to be notoriously unsuccessful. That this is true may be observed from the fact that the bulk of the potassium carbonate manufactured today is produced by carbonating potassium hydroxide, which latter compound is comparatively expensive by virtue of its electrolytic preparation from potassium chloride.

Apparently the basic reason behind the difference between potassium and sodium in this reaction lies in the fact that whereas the solubility relationships are favorable in Reaction 1, the sodium process, they are not favorable in Reaction 2:

$$KCl + NH_3 + CO_2 + H_2O \underset{aq.}{\rightleftarrows} KHCO_3 + NH_4Cl \quad (2)$$

The systems which result from the carbonation and ammoniation of potassium chloride or sodium chloride may be considered as comprising the chlorides and bicarbonates of ammonium and potassium or sodium. The reactions may then be briefly represented, and are often referred to as involving the reversible double decomposition of the corresponding alkali metal chloride and ammonium bicarbonate, viz:

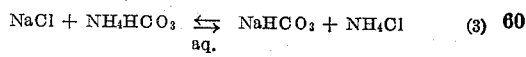
$$NaCl + NH_4HCO_3 \underset{aq.}{\rightleftarrows} NaHCO_3 + NH_4Cl \quad (3)$$

$$KCl + NH_4HCO_3 \underset{aq.}{\rightleftarrows} KHCO_3 + NH_4Cl \quad (4)$$

The reaction proceeds under conditions of concentration and temperature which selectively precipitate the least soluble salt of the reaction liquor or system and in the direction occupied by that salt. In Reaction 3 the solubility in water of the sodium bicarbonate is less than that of the other three compounds, and accordingly it is easily recoverable as a precipitate. In the potassium system (4), the potassium bicarbonate does not precipitate in economically feasible yield and purity with respect to ammonium bicarbonate because of the relatively high solubility of the former.

Many attempts have been made to eliminate this difficulty but apparently to no avail. Whereas alternative processes have been advanced, there is today no commercially workable potassium process analogous to the ammonia-soda process. The alternative processes have proven to be defective, inadequate, or undesirable in that they are characterized by one or more of the following: undesirable high pressures, high temperatures, expensive raw materials, expensive or otherwise undesirable solvents or catalysts, long reaction times, complex reactions, low yields, and impure products.

One object of this invention is to provide a simple inexpensive, easily operable, efficient, integrated process for the manufacture of potassium bicarbonate and potassium carbonate from potassium chloride.

A second object of this invention is to provide a new method of recovery of a prepared potassium bicarbonate and potassium carbonate, this method involving unique dilution and cooling operations.

A further object of this invention is to provide a system utilizing cheap raw materials, low temperatures and pressures and short reaction times.

Further objects and advantages of this invention will be apparent from the following description:

According to this invention, a water-soluble potassium salt, e. g. potassium chloride, is reacted in suitable proportion with ammonium bicarbonate within an aqueous menstruum, and the precipitation of product potassium bicarbonate is effected therefrom by the addition thereto of an amine which is stronger in basic properties than ammonium hydroxide. The term "amine" includes substituted amines such as -olamines which otherwise fulfill the necessary prerequisites. Such addition may occur at any time prior to the separation of potassium bicarbonate, but it is preferred practice to incorporate at least part of the amine with the potassium salt before the reactants are mixed. When so present during the preparation of the reaction liquor, the concentration of the amine is preferably somewhat lower than that preferred for the later precipitation concentration which then may be achieved by supplemental addition of amine. In practice of the invention, purity of the precipitated potassium bicarbonate is at least comparable to purities obtained by any present commercial method.

Mother-liquor containing the amine, after precipitation and separation of the desired potassium bicarbonate, may be treated to recover the components contained therein which may be utilized in the reaction.

Nitrogenous organic compounds used in practice of this invention include representatives of the class of amines which are stronger in basic properties than ammonium hydroxide in equivalent concentration and may be exemplified by the following:

a. Monoisopropylamine
  b. Diethylamine
  c. Ethylenediamine
  d. Di-n-butylamine
  e. Isobutylamine
  f. n-Butylamine
  g. Di-n-propylamine
  h. Diethylenetriamine
  i. Propylenediamine In the above listing monoisopropylamine is believed to be the most desirable along with diethylamine and ethylenediamine. In the system under consideration, in the presence of bicarbonate ion, these compounds may be

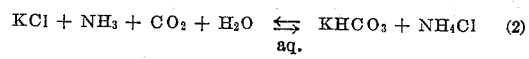

found in the solution as both the free compound and the soluble salts.

According to one embodiment of this invention, the reaction between potassium chloride and the bicarbonate ion is effected in the presence of at least a portion of the selected amine stronger in basic properties than ammonium hydroxide, to produce a reaction liquor or solution containing selectively precipitatable potassium bicarbonate. This solution, preferably after dilution with additional amine, is cooled in one or more steps, to precipitate the bicarbonate from reaction or mother liquor containing the amine and by-product ammonium chloride, unreacted potassium chloride, and amine salts. The precipitate is separated, to be calcined to potassium carbonate, if desired. Mother liquor is then distilled to produce: a distillate containing free ammonia, water, and amine if the latter is lower boiling than water; and residue containing unreacted potassium chloride, water, amine compounds, if present, and amine if the latter is higher boiling than water. When the amine is present in the residue, the amine is separated by filtration, and the residue is diluted with water if necessary. The substantially amine-free aqueous distillation residue, containing salts including the amine salt, is then alkalinized by addition thereto of lime or an alkali metal caustic, e. g., caustic soda or potash to liberate additional quantities of free amine and ammonia. For efficiency of reaction in the system of the invention, alkali metal caustic is preferred. Alkalinized material is distilled and amine-containing distillate therefrom may be further treated by distillation to produce pure amine. In purified or as recovered form, it may be recycled to be used with original charge, either alone or in admixture with fresh amine. Recovered amine may also be recycled to the dilution step. The ammonia recovered from the alkalinizing and distillation operations together with needed make-up, may be reacted with water and the carbon dioxide recovered from the calcining operation, to form ammonium bicarbonate to be used in the reaction operation.

The foregoing embodiment and modifications of the process of the invention may be described in connection with the attached drawing which is a diagrammatic flow sheet.

According to preferred practice shown in the drawing, wet or anhydrous monoisopropylamine, depending upon conditions hereinafter described, is admitted through line 10 to mixing vessel 12 simultaneously with water from line 13. The heat of dilution of monoisopropylamine in vessel 12 may raise the temperature of the mixture to as high as 35° C. The mixture of monoisopropylamine and water containing from 25 to 60%, say 50% by volume of the former is withdrawn from vessel 12 through line 14 and is passed through heat exchanger 15, cooled by coolant in line 16. The temperature of the mixture as it leaves cooler 15 will be less than 35° C. (the boiling point of the monoisopropylamine) and it may be as low as 20° C. Preferably as admitted to vessel 18, the mixture at a temperature of 30° C., is contacted with charge crystalline potassium chloride admitted through line 19. Solid potassium chloride is added to form an essentially saturated solution thereof. A portion of the potassium chloride charge may be potassium chloride admitted to vessel 18 through line 53, as solution. As mixed in vessel 18 and removed therefrom through line 20 the solution will advantageously contain at 30° C., about 7.8 g.–8.0 g. of potassium chloride/100 ml. of total solution and essentially equal volumetric amounts of water and monoisopropylamine. Under other conditions of operation e. g. other temperatures or ratios of monoisopropylamine to water, or other amines, the concentration of potassium chloride in the mixture will vary although in each case the solution will preferably be substantially saturated with potassium chloride. This solution is contacted in vessel 21 with solid ammonium bicarbonate entering through line 22. The ammonium bicarbonate may also advantageously be admitted in the form of wet crystals or as a concentrated aqueous slurry. The mixture is retained in this vessel only for time sufficient under existing temperature and pressure to effect the desired degree of completion of the reaction.

The concentration of bicarbonate ion, desirably introduced in the form of solid ammonium bicarbonate, is preferably in excess of 10% to 70% or 75%, say 50%, over the potassium ion present in vessel 21.

The ratio of stoichiometric quantities of amine to excess bicarbonate ion present at this point is at least 5.5:1 and may be as high as 100:1, and preferably is about 20 to 30:1. Excellent results are obatined under the other conditions of this embodiment of the invention with ratio of 27–28:1, for example about 27.5:1. Since this ratio is substantially greater than 1:1, a major portion of the base is present in subsequent steps as the free compound as distinguished from its salts.

The time of reaction between the ammonium bicarbonate and the potassium chloride, i. e. the time of retention in vessel 21 should be kept to a minimum which is consistent with obtention of high yields and minimization of by-product formation. In practice the reaction time will be substantially less than two hours, 30 minutes being the suggested maximum. Preferred time of 15 minutes between the addition of ammonium bicarbonate and the point of dilution produces satisfactory results, but shorter retention time may be employed. Although this time of retention is a function of the temperature and pressure of the system and the particular amine employed, it is found that unless it is maintained less than the indicated limits, the desired yields and behavior are not obtained on subsequent dilution and cooling.

The temperature in vessel 21 may be controlled if desired by a heat exchanger therein (not shown) and preferably it is maintained below about 35° C. when the reaction is conducted at atmospheric pressure. Effluent solution from vessel 21 is withdrawn through line 23 and passed through heat exchanger 24 cooled by coolant in line 25, to a temperature of −10° C. to +10° C, say 0° C. This cooled solution, containing potassium bicarbonate, is diluted with additional monoisopropylamine from line 26, the solution in line 23 containing 75–90%, say 80–85% by volume of monoisopropylamine after dilution.

The dilution of effluent as it leaves vessel 21, as at line 23 in the drawing, from a monoisopropylamine content of 50% to e. g. 83.5% has been found to give a net yield of about 94.3% of substantially pure product. In general in the range of 50% to 90% concentration by volume of base, the yield increases in proportion to the additional dilution.

The following Table A shows the yield and purity of product potash in terms of the percent of potassium chloride contained therein, as a function of the percent of monoisopropylamine in the final diluted volume when starting with a 50% solution of monoisopropylamine, which had been treated with a 50% stoichiometric excess of ammonium bicarbonate solid.

Table A

| Expt. No. | Final Vol., Percent MIPA | Percent Yield | Calcined Solids ||
|---|---|---|---|---|
| | | | Percent $K_2CO_3$ | Percent KCl |
| 10 | 66.6 | 67.9 | 99.7 | 0.3 |
| 9 | 71.5 | 77.5 | 99.76 | 0.24 |
| 12 | 75.0 | 85.3 | 99.77 | 0.23 |
| 14 | 83.5 | 94.3 | 99.7 | 0.3 |

Thus it can be seen that substantial additional yields of product are obtained with no diminution in purity by greater dilution of the effluent liquor within the range indicated.

Although all the monoisopropylamine may be present during the reaction in preferred operation at least the major portion thereof is added as through line 26, to the system after the reaction has been completed. However, its presence during the reaction permits short reaction time, and accordingly it is also preferred that a portion of the amine be present during the reaction, usually a minor proportion say up to or somewhat over one-third of the total amine present during precipitation. It is essential under any conditions to bring the desired amount of monoisopropylamine into the system before the filtration operation and then preferably prior to cooling in order that the potassium bicarbonate may be properly precipitated from the reaction liquor in good yield.

When the monoisopropylamine is added from line 26 to line 23, the heat of dilution raises the temperature from e. g. 0° C. to a higher value depending on the particular conditions of operation. The temperature rise resulting from the heat of dilution may be compensated by cooling the monoisopropylamine in heat exchanger 69, and in this manner the net diluted solution will be maintained below its boiling point and at precipitation temperature.

To effect precipitation of the potassium bicarbonate most advantageously, the diluted effluent in line 23 may be cooled in cooler 75 by coolant or refrigerant in line 76. The ultimate temperature of cooling may be as low as 0° C. although it may be as high as 20° C. Preferably the cooled effluent in line 23 is filtered in two steps, the first filtration being conducted in the upper portion of the temperature range, say 20° C., and the second filtration being conducted in the lower portion of the temperature range, say 0° C.

The cooled effluent at 20° C. in line 23 is filtered in filter 27, the residue, crude potassium bicarbonate, being washed with absolute methyl alcohol in lines 29 and 30, or alternatively with saturated aqueous potassium bicarbonate solution. The wash solution may also be aqueous monoisopropylamine in concentration of say 75%. Due to the comparatively high temperature of filtration, the potassium bicarbonate recovered in container 28, is of high purity, containing very little (less than 0.5%) potassium chloride. The crude bicarbonate obtained may be removed through line 31 or it may be passed through line 32 to calciner 33.

In calciner 33 the crude potassium bicarbonate is purified by heating to decompose heat unstable by-products, including ammonium bicarbonate. This mild heating produces substantially pure potassium bicarbonate. Where the desired ultimate product is potassium carbonate with potassium bicarbonate as an intermediate product, this will not be separately done. For conversion to potassium carbonate, the crude bicarbonate is strongly heated to drive off chemically combined water and carbon dioxide. Product potassium carbonate or bicarbonate is recovered from line 34.

By-product carbon dioxide (containing water, monoisopropylamine and possibly some ammonia) may be removed at line 74 and, after being passed to an intermediate storage, be passed to the ammonium bicarbonate production operation 71. Any monoisopropanolamine and ammonia liberated in kiln 33 may be separately recovered or they may be passed directly to step 71 through line 35. The products of combustion from kiln 33 may be separately recovered or they may be passed directly to step 71 in similar fashion. Through line 79, make-up carbon dioxide may be added or as is more likely, excess carbon dioxide may be removed.

The mother liquor from filter 27 at a temperature of say 20° C., is withdrawn therefrom and passed through cooler 37, cooled by coolant 38, and thence passed through line 36 to second filter 77. As filtered here the temperature of operation may be 0° C., and the precipitated potassium bicarbonate will contain somewhat greater amounts of potassium chloride than is found in that product removed e. g. through line 31 from the first filter 27. Crude potassium bicarbonate from filter 77 may be washed with liquid passing through lines 78 and 39. This second crude product is removed through line 40 to be separately treated in the manner in which the material in line 32 is treated, to yield the desired product potassium bicarbonate or potassium carbonate.

The mother liquor from filter 77 is removed through line 41, and passed through heater 73 to distillation system 43. In distillation system 43 the overhead contains ammonia which is removed through line 45, and a distillate removed through line 44. The distillate contains water and that portion of the monoisopropylamine which is in the solution in line 41 in a chemically uncombined form. The monoisopropylamine may be removed from the distillation operation 43 as aqueous solution to be recycled through line 60 to vessel 63. The distillation operation 43 is conducted to the extent necessary to remove therefrom substantially all of the uncombined ammonia and uncombined monoisopropylamine contained therein and also to remove a portion of the water. This distillation may advantageously be conducted under vacuum at which lower pressures the liquid more easily boils.

Monoisopropylamine has a boiling point lower than that of water and accordingly it is readily distillable from the liquid in line 41. When the amine present in the system has a boiling point greater than that of water, operation of the distillation 43 may be modified somewhat to compensate for this factor. Under these conditions, ammonia will be recovered as distillation overhead and be removed as through line 45. Overhead will also include water which may contain amine which has been steam distilled along with the water. This is passed as through line 44 to line 60. The distillation may be continued until salts in the residue precipitate to form a slurry. Upon removal from the distillation operation and filtering, the liquid filtrate containing amine and some water may be passed to line 60 to be further purified or separated as hereinafter indicated. The solid filter cake from this operation will contain water-soluble salts (together with minor amounts of amine and water) which may be dissolved in water to form a solution.

The solution formed as above-indicated or the distillation bottoms in line 46 may principally contain amine hydrochloride, amine carbonate, amine bicarbonate, and unreacted potassium chloride together with lesser amounts of free amine, ammonium chloride, ammonium bicarbonate, and potassium bicarbonate. It is noted that most of the ammonium salts will have been decomposed by the stronger base amine and the solution in line 46 will generally contain minimal amounts of ammonia.

Liquid in line 46, as above indicated, may be heated as by heat exchanger 47 and passed to an alkalizing operation 56. Although in practice the distillation and alkalizing operations may be combined and conducted in a single unit, they are separately set forth in the drawing to indicate more clearly the sequence of steps. Warm charge liquid in line 46 is admitted to alkalizing operation 56 wherein it is contacted with caustic solution admitted thereto through line 57.

Although the causticization of liquid in line 46 may be accomplished with lime, the preferred agent is potassium hydroxide or sodium hydroxide. Additional distilling may be provided within the alkalizing operation as desired to yield a bottoms therefrom in line 58 which is free of ammonia and amine in combined or uncombined form.

Although as indicated there will be little or no ammonia liberated in the alkalizing operation, any which is liberated therein may be separated and withdrawn through line 59 to be passed to line 61. Amine liberated in the alkalizer may be withdrawn therefrom through line 60, separately from the ammonia liberated therein. Amine liquid, which may contain water, in line 60 is passed to vessel 63.

The liquid collected in vessel 63, a mixture of water and monoisipropylamine, may be passed directly through line 10 to be used as charge to vessel 12 or it may be enriched with anhydrous monoisopropylamine from line 79. Preferably however the mixture in vessel 63 is passed through line 64 to distillation recovery system 65 wherein at least a portion of the water contained therein is separated and removed through line 66.

Distillation recovery system 65 may be operated as indicated to remove substantially all the water from the stream in line 64. Optionally however that portion of the charge to be ultimately withdrawn therefrom through line 70 to be passed through line 10 to vessel 12 may be only enriched in amine. The amine passed through line 26 for use as diluent added to line 23, is preferably water-free or at least highly concentrated. To achieve desired high concentration, make-up amine may be added to line 26 before cooling if desired in exchanger 69 by cooling medium in line 80. Ammonia if present in line 64 will be removed from system 65 through line 48 and passed to line 61. Additionally or alternatively make-up amine may be added to the contents of line 67 for use in whole or in part as charge to vessel 12.

Ammonia from recovery operations, e. g. distillation operation 43 and alkalizing operation 56, is passed through line 61 to the ammonium bicarbonate production step wherein it is reacted with water entering through line 72 and carbon dioxide entering through line 35. The reaction product ammonium bicarbonate-$NH_4HCO_3$ preferably as solid is thence passed through line 22 to be used in vessel 21.

In the following examples illustrative yields and purities of desired product obtained by practice of the invention with several typical amines embraced within its scope are set ofrth. In these examples, the yields of crude filter cake are given as percentage of theoretical based on original potassium chloride.

Example I.—Monoisopropylamine 7.8 g. of potassium chloride was dissolved in 50 ml. of water and 50 ml. of monoisopropylamine was then added. The mixture was brought to a temperature less than 30° C. and 12.5 g. of solid ammonium bicarbonate (50% excess) was added thereto. The resultant clear solution was cooled to 0° C. and further diluted by the slow addition of 100 ml. of monoisopropylamine during which addition the temperature rose to 20° C. This solution containing 75% monoisopropylamine was cooled to 0° C. and filtered. 146.5 g. of filtrate was obtained. After methanol washing and air drying, 9.0 g. (85.3% yield) of crude product filter cake was obtained. Analysis of this crude product indicated that its composition was as follows: 99.3% potassium bicarbonate, 0.14% potassium chloride and 0.56% other impurities including ammonium bicarbonate. Upon calcination, potassium carbonate of 99.77% purity was obtained containing only 0.23% potassium chloride.

Example II.—Diethylamine 8.4 g. of potassium chloride was dissolved in 50 ml. of water and the solution brought to 35° C. before the addition of 50 ml. of diethylamine. 13.4 g. solid ammonium bicarbonate (50% excess) was then added and the solution was cooled to 0° C. The concentration of diethylamine was increased to 75% by the addition of 100 ml. thereof. The solution, now at a temperature of less than 10° C., was cooled to 0° C. and filtered. 166 ml. of filtrate was obtained. After methanol washing and air drying, 9.8 g. (86.6% yield) of crude product filter cake was obtained. Analysis of this crude product revealed that its composition was as follows; 99.5% potassium bicarbonate, 0.3% potassium chloride, and 0.2% other impurities including ammonium bicarbonate. Upon calcination, potassium carbonate of 99.55% purity was obtained containing only 0.45% potassium chloride.

Example III.—Ethylenediamine 7.9 g. of potassium chloride was added to a mixture of 50 ml. of water and 50 ml. of commercial ethylenediamine. The mixture was brought to 35° C. and 12.6 g. of ammonium bicarbonate (50% excess) was added. The resultant solution was cooled to 0° C. and diluted with 100 ml. of commercial ethylenediamine. The 75% amine solution at 24° C. was cooled to 0° C. and filtered. 205.8 g. of filtrate was recovered. After methanol washing and air drying 9.3 g. (86.5% yield) of crude product filter cake was obtained. Analysis revealed a composition of 98.3% potassium bicarbonate, 0.0% potassium chloride, and 1.7% other impurities including ammonium bicarbonate. Upon calcination 100% pure potassium carbonate was obtained.

Example IV.—Monoisopropanolamine 5.4 g. of potassium chloride was dissolved in a mixture of 50 ml. of monoisopropanolamine and 50 ml. of water at 35° C. 8.6 g. of ammonium bicarbonate (50% excess) was added, and the resultant solution was cooled to 0° C. The solution was diluted to 75% amine concentration by the addition of 100 ml. monoisopropanolamine. Upon cooling from 30° C. to 0° C. and filtration, 186 ml. of filtrate is obtained. The methanol washed and air dried crude product filter cake weighed 6.1 g. (81.0% yield). Analysis revealed a composition of 96.2% potassium bicarbonate, 0.13% potassium chloride, and 3.7% other impurities including ammonium bicarbonate. Upon calcination the product contained 99.8% potassium carbonate and 0.2% potassium chloride.

Practice of the invention provides for production of potassium carbonate or bicarbonate, as the case may be, of grades or purity capable of meeting even the most exacting needs for commercial product or use and in yields which are economically attractive. With proper control of operating conditions as indicated, 99% and higher purity potassium bicarbonate may be recovered in yield as high as about 85% of theoretical based on potassium chloride.

The nitrogen compounds whose use characterizes the invention permit obtention of these advantageous results without themselves undergoing chemical or other changes necessitating unduly costly or complex procedure for their reuse within the system including, when desired, their substantial isolation from other components of the system. Such reuse is accompanied with substantially no loss except such small losses as may occur from time to time for mechanical reasons.

I claim:

1. The method of preparing potassium bicarbonate comprising forming a solution which will precipitate this compound upon being cooled composed of water, potassium chloride, ammonium bicarbonate in quantity at least stoichiometrically equivalent to said potassium chloride, and an amine stronger in basic properties than ammonium hydroxide in quantity at least about 66.6% by volume of said solution and at least about 5.5 times that stoichiometrically equivalent to said ammonium bicarbonate, and cooling said solution within two hours of its formation until potassium bicarbonate precipitates therefrom.

2. The method as claimed in claim 1 wherein said amine is selected from the group consisting of monoisopropylamine, diethylamine, ethylenediamine, di-n-butylamine, isobutylamine, n-butylamine, di-n-propylamine, diethylenetriamine, and propylenediamine.

3. The method of preparing potassium bicarbonate comprising forming a solution which will precipitate this compound upon being cooled composed of water, potassium chloride, ammonium bicarbonate in quantity at least 10% in excess over that stoichiometrically equivalent to said potassium chloride, and an amine stronger in basic properties than ammonium hydroxide in quantity at least about 66.6% by volume of said solution and at least about 5.5 times that stoichiometrically equivalent to said ammonium bicarbonate, and cooling said solution within about 30 minutes of its formation until potassium bicarbonate precipitates therefrom.

4. The method of preparing potassium bicarbonate comprising forming a solution which will precipitate this compound upon being cooled composed of water, potassium chloride, ammonium bicarbonate in quantity substantially to saturate said solution 10%–75% in excess over that stoichiometrically equivalent to said potassium chloride, and an amine stronger in basic properties than ammonium hydroxide in quantity at least about 66.6% by volume of said solution and at least about 5.5 times that stoichiometrically equivalent to said ammonium bicarbonate, and cooling said solution within about 30 minutes of its formation until potassium bicarbonate precipitates therefrom.

5. Process according to claim 4 wherein the amine is monoisopropylamine.

6. Process according to claim 4 wherein the amine is diethylamine.

7. Process according to claim 4 wherein the amine is ethylenediamine.

8. The method of preparing potassium bicarbonate comprising forming a solution which will precipitate this compound upon being cooled composed of water, potassium chloride, ammonium bicarbonate in quantity at least stoichiometrically equivalent to said potassium chloride and, as at least 25% but less that 66.6% by volume of said solution of an amine stronger in basic properties than ammonium hydroxide, adding further such amine to said solution to increase the quantity thereof to at least 66.6% of solution volume and to at least 5.5 times that stoichiometrically equivalent to said ammonium bicarbonate, and within about 30 minutes after formation of said solution cooling the same until potassium bicarbonate precipitates therefrom.

9. The method of preparing potassium bicarbonate comprising forming a solution which will precipitate this compound upon being cooled composed of water, potassium chloride, ammonium bicarbonate in quantity at least stoichiometrically equivalent to said potassium chloride and, as 25% to 60% by volume of said solution, an amine stronger in basic properties than ammonium hydroxide, adding further amine to said solution to increase the quantity thereof to at least 66.6% of solution volume and to at least 5.5 times that stoichiometrically equivalent to said ammonium bicarbonate, and within about 30 minutes after formation of said solution cooling the same until potassium bicarbonate precipitates therefrom.

10. The method of preparing potassium bicarbonate comprising forming a solution which will precipitate this compound upon being cooled composed of water, potassium chloride, ammonium bicarbonate in quantity at least 10% in excess over that stoichiometrically equivalent to said potassium chloride and, as 25% to 60% by volume of said solution, an amine stronger in basic properties than ammonium hydroxide, adding further amine to said solution to increase the quantity thereof to at least 66.6% but not over 90% of solution volume and to at least 5.5 times that stoichiometrically equivalent to said ammonium bicarbonate, and within about 30 minutes after formation of said solution cooling the same until potassium bicarbonate precipitates therefrom.

11. Process according to claim 10 wherein the amine is monoisopropylamine.

12. Process according to claim 10 wherein the amine is diethylamine.

13. Process according to claim 10 wherein the amine is ethylenediamine.

References Cited in the file of this patent

UNITED STATES PATENTS

| 2,013,977 | Weiss | Sept. 10, 1935 |

FOREIGN PATENTS

| 1,045,657 | France | Nov. 30, 1953 |
| 3,967 | Great Britain | 1878 |